United States Patent [19]
Capelle

[11] Patent Number: 4,643,660  
[45] Date of Patent: Feb. 17, 1987

[54] SCREW EXTRUSION PRESS HAVING BARREL TEMPERATURE CONTROL MEANS

[75] Inventor: Gerd Capelle, Langenhagen, Fed. Rep. of Germany

[73] Assignee: Herman Berstorff Maschinenbau GmbH, Hanover, Fed. Rep. of Germany

[21] Appl. No.: 754,126

[22] Filed: Jul. 12, 1985

[30] Foreign Application Priority Data

May 25, 1985 [DE] Fed. Rep. of Germany ....... 3518997

[51] Int. Cl.$^4$ ............................................. B29B 7/82
[52] U.S. Cl. .................................... 425/190; 165/143; 285/133.1; 366/144; 425/378 R
[58] Field of Search ...................... 366/144, 147, 149; 264/349, 40.6; 425/143, 144, 200, 203, 204, 207, 208, 378 R, 378 S, 190, 379 S, 379 R; 285/133 R; 165/143

[56] References Cited

U.S. PATENT DOCUMENTS

| | | | |
|---|---|---|---|
| 1,497,652 | 6/1924 | Browne | 285/133 R |
| 1,954,454 | 4/1934 | McFarland | 285/133 R |
| 2,211,387 | 8/1940 | Routh | 366/149 |
| 3,167,812 | 2/1965 | Von Bennigsen | 425/379 R |
| 3,937,495 | 2/1976 | Anders | 285/133 R |
| 4,121,858 | 10/1978 | Schulz | 285/133 R |
| 4,235,581 | 11/1980 | Anders | 425/378 R |

FOREIGN PATENT DOCUMENTS

| | | | |
|---|---|---|---|
| 2316937 | 10/1974 | Fed. Rep. of Germany | 165/143 |
| 2034839 | 6/1980 | United Kingdom | 285/133 R |

Primary Examiner—Jay H. Woo
Assistant Examiner—J. Fortenberry
Attorney, Agent, or Firm—Schwartz, Jeffery, Schwaab, Mack, Blumenthal & Evans

[57] ABSTRACT

A screw extrusion press having a barrel temperature control means is disclosed, which press permits the inner liner or cylinder of the barrel or a portion thereof to be replaced rapidly without necessitating simultaneous replacement of the temperature control means. This object is achieved by providing intermediate rings between individual extruder barrel portions, the rings each defining annular passages and guide means for the temperature control medium.

3 Claims, 6 Drawing Figures

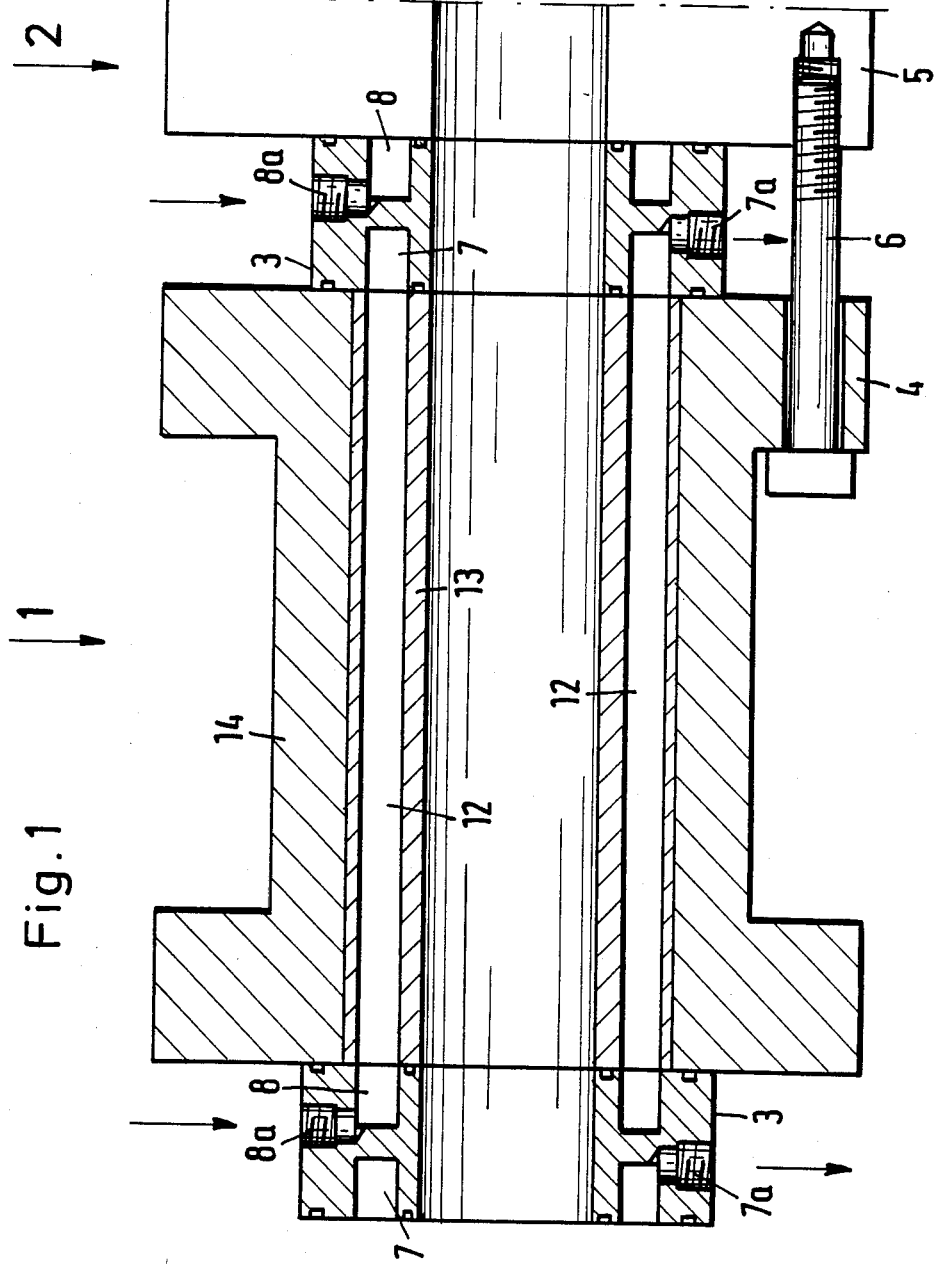

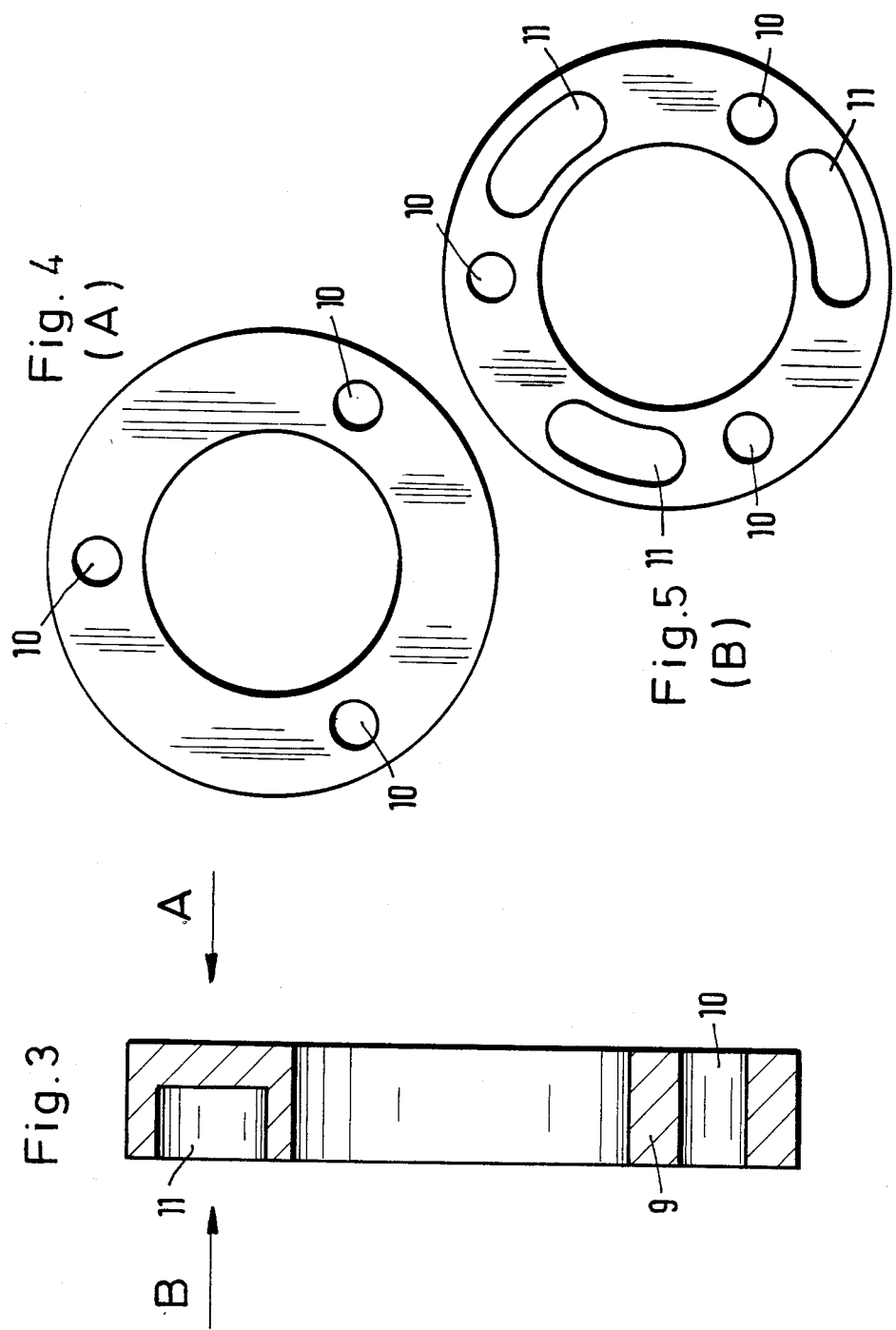

SCREW EXTRUSION PRESS HAVING BARREL TEMPERATURE CONTROL MEANS

FIELD OF THE INVENTION

The present invention relates to a screw extrusion press having barrel temperature control means. More particularly, the present invention relates to an extrusion press of the type in which an extrusion screw rotates in a barrel. The barrel is made of a plurality of sections and the sections are provided with axially extending peripheral bores for a temperature control medium. The bores are connected to a supply conduit and to a discharge conduit for the temperature control medium. The extrusion press is used for processing thermoplastics materials and rubber.

BACKGROUND OF THE INVENTION AND PRIOR ART DISCUSSION

In U.S. Pat. No. 4,235,581, there is disclosed a screw extrusion press which includes barrel temperature control means. The barrel is in sections and is provided with peripheral bores extending axially along the barrel and through which a temperature control medium is circulated. These bores permit the termperature control medium to circulate through annular passages which are provided both in the barrel and in the connecting flanges between the barrel sections.

However, highly abrasive substances are often processed in extruders of this type. Such substances produce wear phenomena on the inner surface of the barrel. After a time, the degree of wear of such surface becomes such as to affect adversely the operation of the press. The entire barrel portion must, in such circumstances, be replaced and this is extremely costly.

These costs are due primarily to the fact that the termperature control means are incorporated in the barrel portion. It would obviously be advantageous if the worn barrel could be replaced without affecting the temperature control means.

OBJECT OF THE PRESENT INVENTION

It is an object of the present invention to provide a screw extrusion press having a barrel temperature control means, the barrel being of the type which has axially extending peripheral bores formed therein, whereby a barrel portion having the peripheral bores formed therein may be replaced very economically and rapidly without the need for the annular passages for a termperature control medium to be replaced as well. These annular passages are, of course, required for circulating the temperature control medium through the peripheral bores. It is obviously desirable to provide an arrangement in which the replacement operation can be effected rapidly and in which as few replacement parts as possible need to be changed at any one time.

SUMMARY OF THE INVENTION

According to the present invention, there is provided a screw extrusion press for processing thermoplastic plastics materials and rubber, comprising a plurality of interconnected, axially aligned, hollow cylindrical, barrel portions, enclosing a screw, the wall of said barrel being formed with a plurality of longitudinally extending bores therethrough which are arranged in at least one set with the bores in each set being disposed adjacent one another and means for passing sequentially through said bores of each set a temperature control medium wherein said means for passing said medium comprise intermediate rings disposed between the adjacent ones of said extruder barrel portions, each said ring defining an internal annular medium supply passage and an internal annular medium discharge passage and including guide means causing said medium in said supply passage to be guided into and sequentially through each said bore in each said set in a meandering manner.

The annular supply and discharge passages and the guide means for ensuring a meandering circulation of the temperature control medium through the peripheral bores are therefore disposed in the intermediate rings located between the individual cylinder portions. Because the barrel generally comprises an outer jacket and an inner cylinder, the axially extending bores being formed in the wall of the inner cylinder, the replacement of a worn inner cylinder can be achieved in a simple manner by, firstly, undoing the connections between adjacent barrel portions and removing the intermediate rings. This connection is usually a screw connection between flanged portions of adjacent sections. The inner cylinder can then be pushed out from the outer jacket and replaced by a new inner cylinder provided with peripheral bores. The intermediate ring is then re-located in position and cylinder portions are re-connected to one another. This arrangement ensures that the inner cylinder of the barrel can be replaced in an extremely economical and rapid manner.

Each of the annular passages is, in a preferred arrangement, provided in a major or end face of the intermediate ring and this facilitates the manufacture of the intermediate ring.

Preferably, each said intermediate ring has opposed major or end faces, each said face defining one of said annular passages, said means for passing said medium additionally comprising an insert ring disposed in each said annular passage, each said insert ring having a major face facing the barrel portion, said face defining at least one blind slot-like recess, said slot-like recess being aligned with at least two of said axially extending peripheral bores formed in said wall of said cylinder and causing said medium entering said slot from one said bore to be deflected and caused to return, in an opposite direction, along said second axially extending peripheral bore and said insert ring further defining throughbores permitting the supply and discharge of said temperature control medium to and from each said set of axially extending bores from and to said annular passages respectively.

Accordingly, in a preferred practical embodiment, the temperature control medium is fed to a supply passage formed in an intermediate ring, flows in a meandering manner sequentially through a set of three axially extending peripheral bores and is then discharged through the discharge passage formed in a second intermediate ring disposed at the other end of the relevant barrel portion.

Advantageously, said annular passages defined in said opposed faces of each said intermediate ring are stepped to form an inner annular passage and an outer annular passage, said inner annular passage having a smaller diameter than said outer annular passage. By so doing, the insert ring can be located in the larger diameter portion of the recess so as to abut against the step defining the smaller diameter portion. It can then be screw-connected or securely welded in place.

BRIEF DESCRIPTION OF THE DRAWINGS

One embodiment of a screw extrusion press provided with barrel temperature control means will be described further, by way of example, with reference to the accompanying drawings, in which:

FIG. 1 is a longitudinal sectional view through a screw extrusion press in accordance with the present invention;

FIG. 3 is a longitudinal sectional view through an insert ring, locatable in a recess formed in a face of the intermediate ring shown in FIG. 2;

FIG. 4 is an elevational view of an insert ring viewed in the direction of arrow A in FIG. 3;

FIG. 5 is an elevational view of the insert ring viewed in the direction of arrow B in FIG. 3.

DESCRIPTION OF PREFERRED EMBODIMENT

In FIG. 1, there is shown a screw extrusion press which comprises axially aligned hollow cylinder portions 1 and 2. The portions 1 and 2 have interposed therebetween intermediate rings 3. The portions 1 and 2 have end flanges 4 and 5 which are interconnected by means of screws 6. A conveyor screw (not shown) is used for processing the material in the hollow interior of the portions 1 and 2. Obviously, the screw rotates in such portions.

Figure 2:
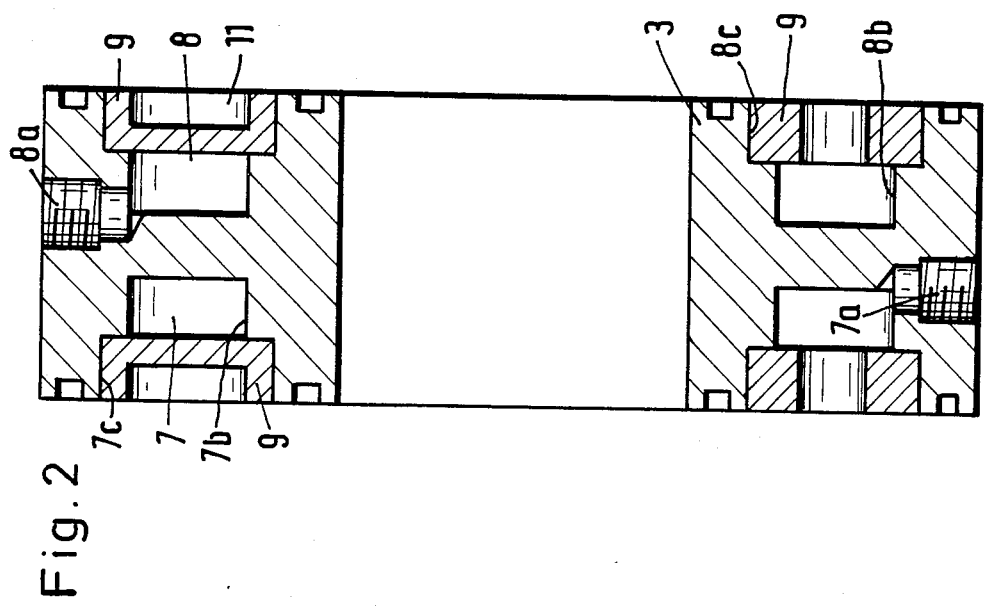
FIG. 2 is a longitudinal sectional view of an intermediate ring forming part of the press shown in FIG. 1 but on an enlarged scale relative thereto.

The intermediate ring 3 is shown in greater detail in FIG. 2. On each of its opposed major faces, an annular passage 8 and 7 is defined. These passages are used, respectively, for the supply and discharge of a temperature control medium.

Insert rings 9 are disposed in both of the annular passages 7 and 8 of each intermediate ring 3. These rings 9 are best seen in FIGS. 3 to 5. In FIGS. 3 and 4, it can be seen that the insert ring 9 has bores 10 extending therethrough from one major face to the other whilst, as can be best seen from FIGS. 3 and 5, it has recessed slots 11 formed in one major face. These slots 11 do not extend fully through the ring 9. As shown, each ring is provided with three bores 10 and three slots 11. The purpose of the bores 10 and slots 11 will be described in greater detail hereinafter.

The barrel portions 1 and 2 each comprise an outer jacket 14 and an inner hollow cylinder 13. The gap between them is made just large enough to permit the cylinder 13 to be ejected from the interior of the jacket 14 in a longitudinal direction. In the periphery of the cylinder 13, passages 12 in the form of drilled bores are provided. These bores 12 extend longitudinally parallel to the axis of the cylinder 13 and from one end thereof to the other. A temperature control medium is caused to flow through these passages.

The manner in which the temperature control is effected will now be described with reference to FIG. 1. For the sake of clarity, the passage of the temperature control medium through a single barrel having an intermediate ring at each of its ends will be described although, as will become apparent hereinafter, the barrel may comprise a plurality of aligned barrel portions each identical to the portion 1, each having an intermediate ring at its two ends and each having a temperature control medium flowing therethrough.

As shown in the upper left hand region of FIG. 1, the temperature control medium is introduced into the ring 3 through a supply conduit 8a. It then enters the annular passage 8. For ease of manufacture, the passage 8 and a recess for receiving an insert ring 9 are produced by providing a single recess having stepped portions 8b and 8c, the insert ring being located in the portion 8c. The medium flows around the channel 8 until it encounters one of the bores 10 in the insert ring 9. The ring 9 is so located that the face thereof, having the slots 11 formed therein, faces the barrel portion 1. The bores 10 in the ring 9 are aligned with certain ones of the passages or drilled bores 12 in the hollow cylinder 13. At the other end of the drilled bore 12, the medium encounters the slotted face, that is to say, the face shown in FIG. 5, of an identical insert ring 9 disposed in a recess formed in a second intermediate ring 3. Again, the face of the ring 9 having the slots 11 formed therein faces the barrel portion 1. The insert ring 9 in this second intermediate ring 3 is angularly offset relative to that in the first intermediate ring 3 so that the medium issuing from the bore 12 enters one end of one of the slots 11. It then flows along the slot 11 to the other end thereof which is aligned with another bore of passage 12. The medium then flows back along this second passage in the opposite direction, that is to say, from right to left as shown in FIG. 1. The medium then enters one end of a slot 11 in the first intermediate ring 3, flows therealong and is caused to enter a third passage or bore 12 aligned with the slot 11. At the end of its third pass along the cylinder, the medium passes through one of the bores 10 provided in the insert ring 9, provided in the, as shown, right hand intermediate ring 3.

Figure 6:
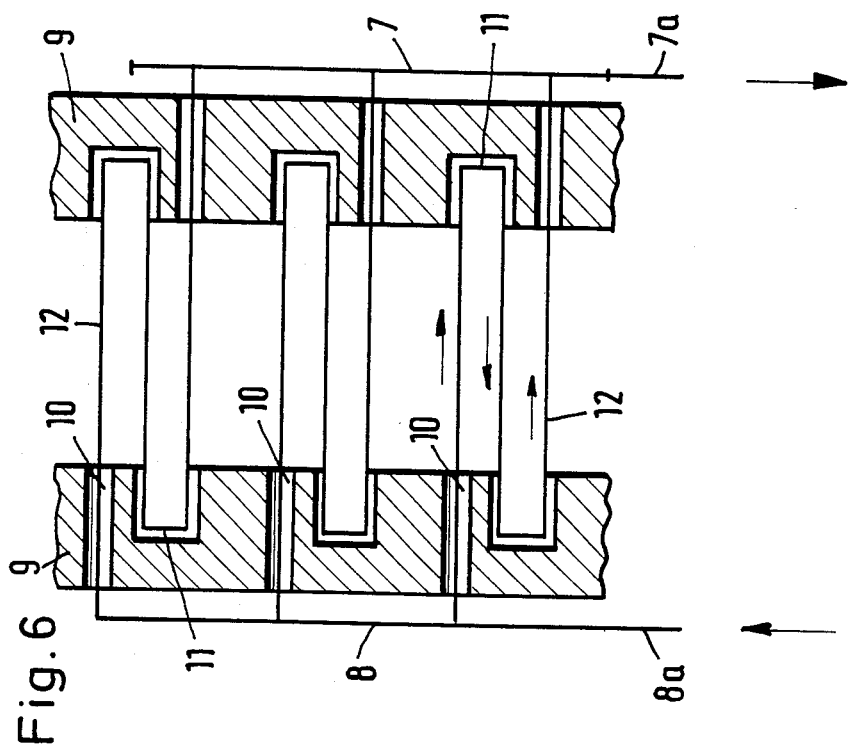
FIG. 6 is a schematic view showing the path which a temperature control medium follows in the intermediate rings and in the cylinder portions, the insert rings being shown schematically.

After passing through the bore 10, the medium passes into the annular passage 7 and thence to the discharge aperture 7a shown in the lower right hand region of FIG. 1. The course followed by the medium is schematically shown in FIG. 6. In FIG. 1, a further annular passage 7 and discharge passage 7a are shown on the left hand ring 3. These are used for medium flowing through a further barrel portion (not shown) adjacent the barrel portion 1. Similarly, a further annular passage 8 and supply passage 8a are shown on the right hand ring 3. These are used for supplying temperature control medium to the barrel portion 2.

As will be apparent from the drawings, the number of passages or drilled bores 12 provided in the cylinder portion 13 of each barrel portion are divided into groups of three and the rings 9 are constructed accordingly. In the embodiment shown, there are three such groups of three bores 12 and each ring 9 therefore has three bores 10 and three slots 11.

Because the stepped recesses 7b and 7c and 8b and 8c respectively are provided in the major faces of each ring 3, the insert ring 9 can be inserted accurately therein and secured. The face of the insert ring 9 terminates flush with the non-recessed portion of the relevant face of the ring 3 and the flush faces are pressed against the cylinder portion 1 when the flange screws 6 are tightened.

The intermediate ring 3 may be provided with centering and fitting members (not shown) to permit the intermediate rings to be assembled in a more advantageous manner.

If it is desirable to replace the inner cylinder 13 of the barrel portion 1, it is merely necessary for the flange screws 6 at each end of the portion 1 to be unscrewed and the intermediate rings 3 adjacent the portion 1 to be removed. The inner cylinder 13 can then be pushed out of the outer jacket 14 by means of a hydraulically operating ejection device (not shown) and may be replaced by a new inner cylinder 13. It is then merely necessary for the flange screws 6 at both ends of the portion 1 to be re-tightened after the intermediate rings 3 have been inserted into their centering means and located in position. This arrangement means that the replacement operation is rapidly effected and also has the advantage that only the component parts which exhibit wear phenomena need to be replaced.

I claim:

1. A screw extrusion press for processing thermoplastic plastics materials and rubber, comprising:
   (a) a plurality of interconnected and axially aligned barrel portions, each said barrel portion including a solid outer jacket having an inner cylindrical surface and an inner hollow cylinder positioned therewithin, a small gap existing between the outer periphery of said hollow cylinder and the inner cylindrical surface of said jacket so as to permit longitudinal sliding movement of said cylinder relative to said jacket for removing said cylinder, said cylinder having an inner cylindrical surface and being adapted to receive a screw for rotation therein,
   (b) a plurality of circumferentially spaced bores extending longitudinally through said cylinder for receiving a temperature control medium, said spaced bores being arranged in sets, each of which comprise a plurality of adjacent bores,
   (c) intermediate rings positioned between adjacent said barrel portions, said rings having an inner cylindrical surface equal in diameter to the diameter of said inner cylindrical surfaces of adjacent said hollow cylinders so as to form a continuous throughbore for receiving a screw, and means for removably securing adjacent said barrel portions to each other with said intermediate rings positioned and aligned therebetween,
   (d) each said intermediate ring being formed with separate internal annular medium supply and discharge passages through which said temperature control medium passes, and
   (e) guide means associated with said supply and discharge passages, said guide means communicating with said sets of said bores formed in said cylinder and being constructed and arranged so that said temperature control medium delivered to said supply passage is guided into and sequentially through each said bore in each said set in a meandering manner,
   whereby when wear occurs on the inner cylindrical surfaces of said cylinders, the barrel portions and the intermediate rings can be disassembled, the cylinders removed and replacement cylinders installed without requiring replacement of said intermediate rings.

2. The screw extrusion press of claim 1, wherein each of said intermediate rings has opposed end faces in which are formed said annular supply and discharge passages, and an annular insert ring positioned in each of said passages, each said insert ring including a plurality of bores corresponding in number to the sets of bores formed in said cylinder and aligned with certain of said bores, and circumferentially spaced slot-like recesses positioned between said insert ring bores and opening toward the adjacent cylinder, each slot-like recess arcuately spanning and being aligned with at least two adjacent bores formed in said cylinder, the recesses of opposed insert rings associated with one of said barrel portions being arcuately misaligned whereby for each set of bores in said cylinder temperature control medium entering said supply passage passes through a bore formed in said insert ring and thence through an aligned longitudinal bore in said cylinder in a first direction, is deflected by said slot-like recess in the opposed insert ring to an adjacent bore formed in said cylinder and passes therethrough in a second direction, is again deflected by a slot-like recess in said insert ring for return passage in said first direction through an adjacent bore in said cylinder to said discharge passage.

3. The screw extrusion press of claim 2, wherein said annular supply and discharge passages are stepped outwardly in diameter, the smaller diameter portions defining said passages and the relatively larger diameter portions receiving said insert rings.

* * * * *